United States Patent
Cramer

(10) Patent No.: US 10,006,614 B2
(45) Date of Patent: Jun. 26, 2018

(54) TWO-PIECE MAGNETICALLY COUPLED FLASHLIGHTS

(71) Applicant: Alliance Sports Group, L.P., Grand Prairie, TX (US)

(72) Inventor: Steven Cramer, Redmond, WA (US)

(73) Assignee: Alliance Sports Group, L.P., Grand Prairie, TX (US)

( * ) Notice: Subject to any disclaimer, the term of this patent is extended or adjusted under 35 U.S.C. 154(b) by 13 days.

(21) Appl. No.: 15/245,330

(22) Filed: Aug. 24, 2016

(65) Prior Publication Data

US 2018/0058671 A1    Mar. 1, 2018

(51) Int. Cl.

| | |
|---|---|
| *F21V 21/096* | (2006.01) |
| *F21V 17/10* | (2006.01) |
| *F21L 4/02* | (2006.01) |
| *F21V 23/04* | (2006.01) |
| *F21V 3/00* | (2015.01) |
| *F21Y 115/10* | (2016.01) |
| *B60Q 1/26* | (2006.01) |

(52) U.S. Cl.
CPC .......... *F21V 21/0965* (2013.01); *F21L 4/027* (2013.01); *F21V 3/00* (2013.01); *F21V 17/105* (2013.01); *F21V 17/107* (2013.01); *F21V 23/0414* (2013.01); *B60Q 1/2615* (2013.01); *F21Y 2115/10* (2016.08)

(58) Field of Classification Search
None
See application file for complete search history.

(56) References Cited

U.S. PATENT DOCUMENTS

| | | |
|---|---|---|
| D289,920 S | 5/1987 | O'Neil |
| D522,234 S | 6/2006 | Murphy |
| D544,388 S | 6/2007 | Chisholm |
| D544,618 S | 6/2007 | Coushaine |
| D553,274 S | 10/2007 | Hill et al. |
| D553,278 S | 10/2007 | Moore |
| D567,414 S | 4/2008 | Schnell |
| D568,516 S | 5/2008 | Hillard |
| 7,390,104 B2 | 6/2008 | Coushaine |
| D581,081 S | 11/2008 | Mier-Langner |

(Continued)

OTHER PUBLICATIONS

"Blazer C6350 Red LED Magnetic Emergency Light" https://www.amazon.com/Blazer-C6350-Magnetic-Emergency-Light/dp/B000N4YGMQ.

(Continued)

*Primary Examiner* — Britt D Hanley
(74) *Attorney, Agent, or Firm* — Thorpe North & Western LLP

(57) ABSTRACT

A lighting device includes a primary housing having a light source and a secondary housing having a light source. The primary housing and the secondary housing can be magnetically and releasably coupled to each other by at least one magnet on either or both housings. The primary housing can include an upper shell and a lower shell pivotally coupled to each other to form a clamshell configuration. A hands-free emergency lighting method can include decoupling the primary housing from the secondary housing and magnetically coupling the secondary housing to a metal surface, such as a vehicle, to indicate an emergency while the primary housing can be opened and used to illuminate an area.

20 Claims, 8 Drawing Sheets

(56) References Cited

U.S. PATENT DOCUMENTS

| | | | |
|---|---|---|---|
| 7,591,572 B1* | 9/2009 | Levine | A47F 11/10 |
| | | | 362/191 |
| D620,164 S | 7/2010 | Chen | |
| D633,635 S | 3/2011 | Poon | |
| D640,815 S | 6/2011 | Yamada et al. | |
| D656,527 S | 3/2012 | May | |
| D682,451 S | 5/2013 | Hardy | |
| D684,269 S | 6/2013 | Wang et al. | |
| D728,849 S | 5/2015 | Hamel et al. | |
| D734,518 S | 7/2015 | Zimmermann | |
| D740,474 S | 10/2015 | Pineau | |
| D744,964 S | 12/2015 | Sachsenweger | |
| D759,867 S | 6/2016 | Grandadam | |
| D775,381 S | 12/2016 | Jacq et al. | |
| 2006/0171145 A1 | 8/2006 | Ford et al. | |
| 2011/0255274 A1* | 10/2011 | Coleman | F21L 4/02 |
| | | | 362/183 |
| 2013/0163234 A1* | 6/2013 | Hsien | F21S 2/005 |
| | | | 362/190 |
| 2013/0163235 A1* | 6/2013 | Chuang | F21V 15/01 |
| | | | 362/190 |

OTHER PUBLICATIONS

"Nordstrand Road Flares Roadside Flashing Emergency LED Lights Beacon with Magnetic Base for Car or Marine" https://www.amazon.com/Nordstrand-Roadside-Flashing-Emergency-Magnetic/dp/B01CNYZ42Y.

"Tumecos Emergency Flare Alert Warning Signal Caution Light LED Beacon Pro with Magnetic Base for Vehicle" https://www.amazon.com/Tumecos-Emergency-Warning-Caution-Magnetic/dp/B01KJ63XDA.

* cited by examiner

TWO-PIECE MAGNETICALLY COUPLED FLASHLIGHTS

BACKGROUND

During emergency situations, such as a vehicle crash or vehicle breakdown, it is important to indicate to other drivers that an emergency exists in order to avoid further accidents. Moreover, during such situations and in low light conditions, it is important to have sufficient lighting for a variety of purposes. It is further important in such situations for a person to be able to use a lighting device that is hands-free to indicate an emergency and to concurrently remedy a vehicle breakdown, for instance.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
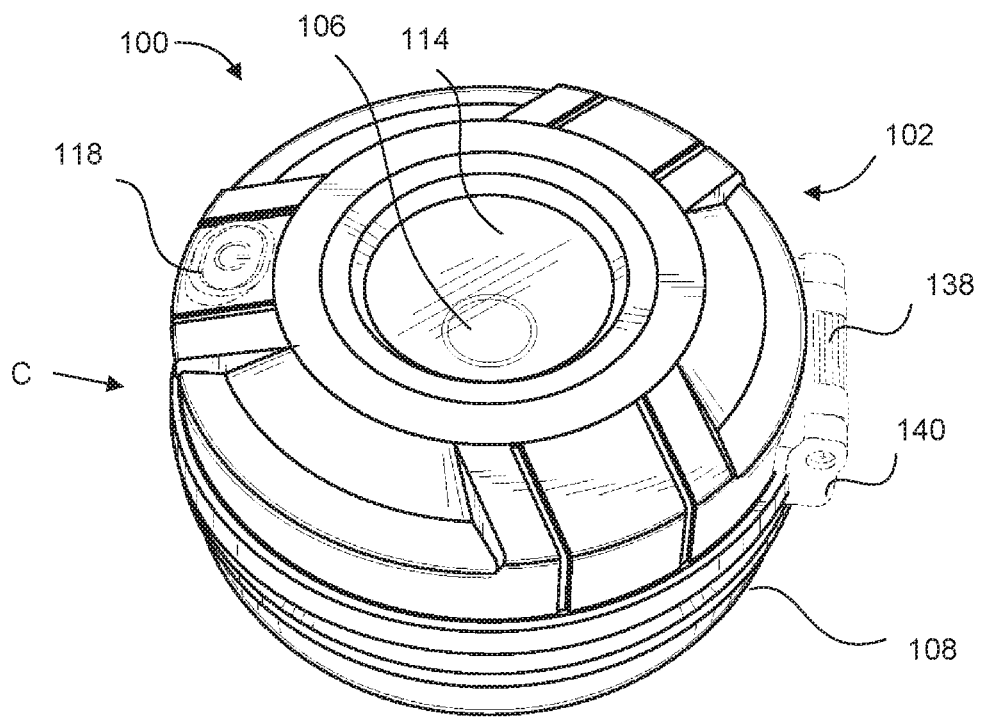
FIG. 1 is an elevated, perspective view of the lighting device in a first configuration in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one example there is provided a lighting device comprising a primary housing having a light source capable of emitting light. The lighting device can include a secondary housing having a light source capable of emitting light. The primary housing and the secondary housing can be magnetically and releasably coupled to each other by at least one magnet on either or both of the primary housing and the secondary housing.

The primary housing and the secondary housing can each be generally cylindrical in shape and, when coupled together, define a generally cylindrical puck though it is understood that a cylindrical shape is not required. In one aspect, the housings are oval, square, or triangular as suits a particular design. In one aspect, the primary housing includes an upper shell and a lower shell pivotally coupled to each other in at least one degree of freedom (though multiple degrees-of-freedom are also contemplated) to form a clamshell configuration. The upper shell can pivot relative to the lower shell in at least 180 degrees. The upper shell can include an attachment portion proximate a perimeter of the upper shell, and the lower shell can include a corresponding attachment portion proximate a perimeter of the lower shell. The attachment portion and the corresponding attachment portion can be pivotally coupled to each other in at least one degree of freedom. The secondary housing can be magnetically couplable to a metal surface, and the light source of the secondary housing can provide an emergency emitting light source.

At least one of the primary housing and the secondary housing can include a friction component positioned between the housings adjacent the respective magnetic. The secondary housing can include an aperture coupleable to a support device to provide a hands-free lighting source. The primary housing and the secondary housing can each include a battery such that the lighting device is devoid of external electrical supply cables.

In one example there is provided a hands-free emergency lighting method. The method can include providing a primary housing magnetically coupled to a secondary housing. The primary housing can have a light source and the secondary housing can have a light source to indicate an emergency, for instance. The method may include decoupling the primary housing from the secondary housing. The method may include magnetically coupling the secondary housing to a metal surface and activating the light source to indicate an emergency. The method may include opening the primary housing whereby the primary housing has an upper shell and a lower shell pivotally coupled to each other in at least one degree of freedom. The method may include resting or coupling the lower shell on a support surface and activating the light source to create a hands-free emergency lighting system using the primary housing coupled to the metal surface and the secondary housing resting on the support surface.

Figure 2:
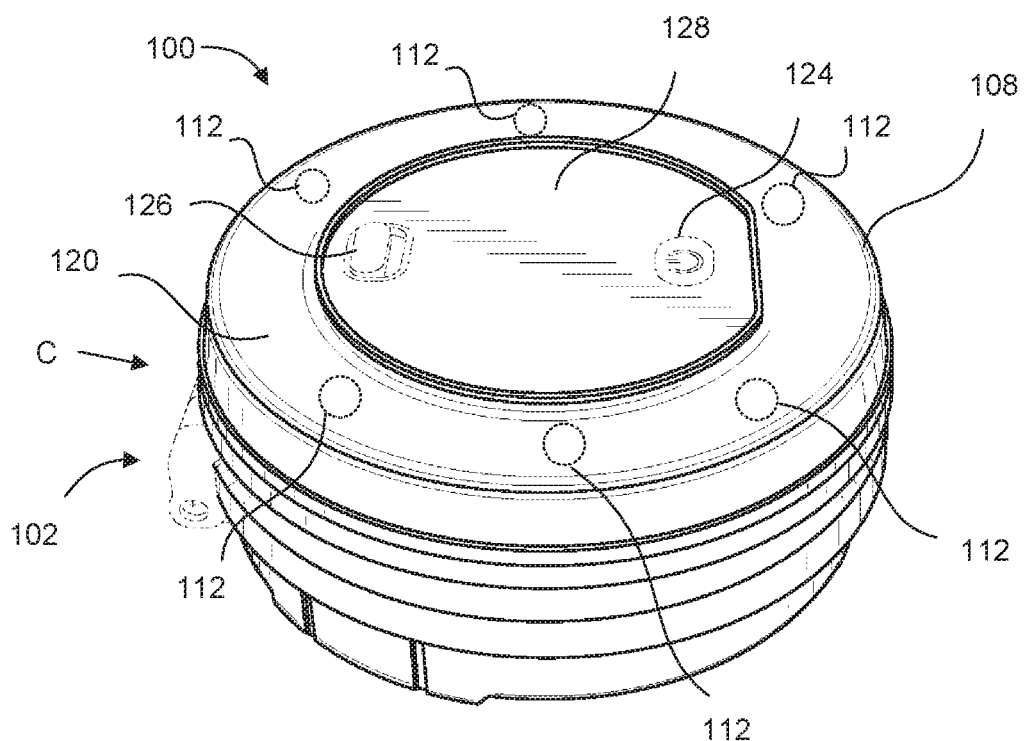
FIG. 2 is a bottom perspective view of FIG. 1.
Figure 3:
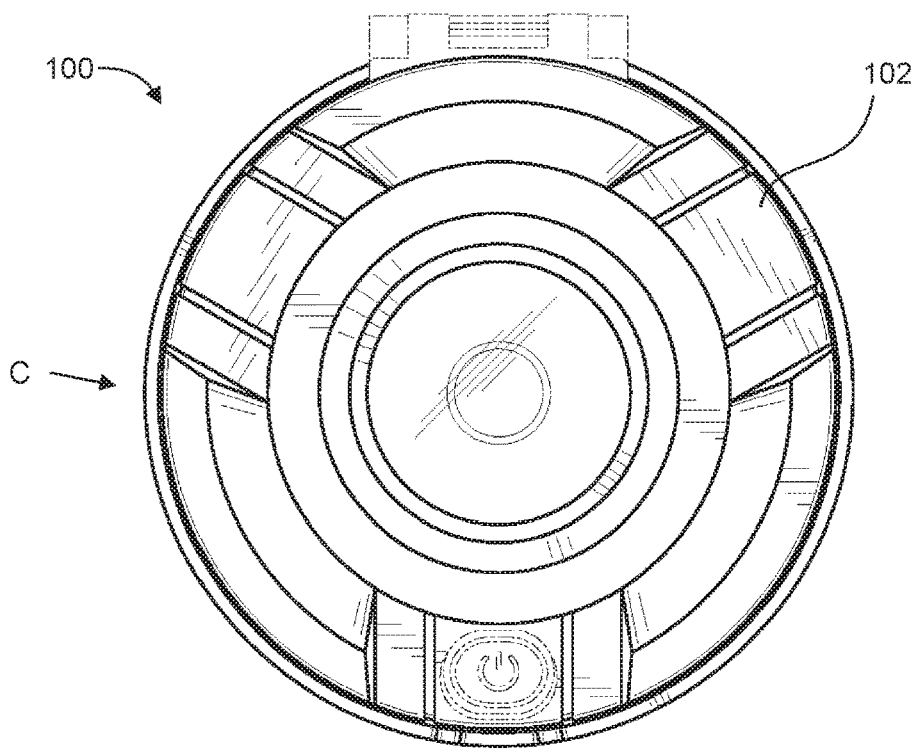
FIG. 3 is top view of FIG. 1.
Figure 4:
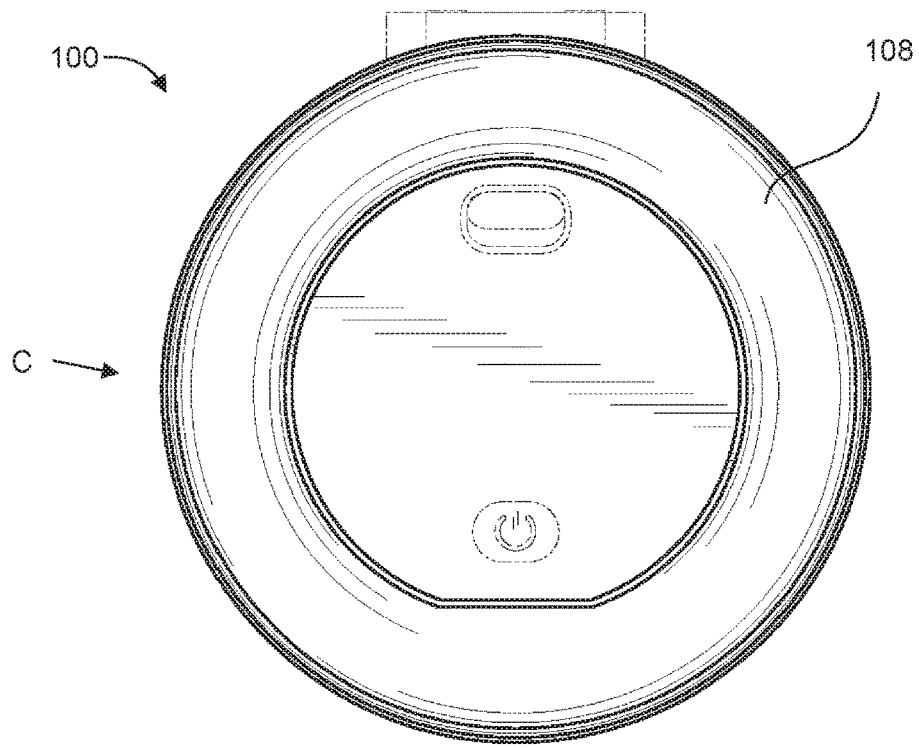
FIG. 4 is a bottom view of FIG. 1.
Figure 5:
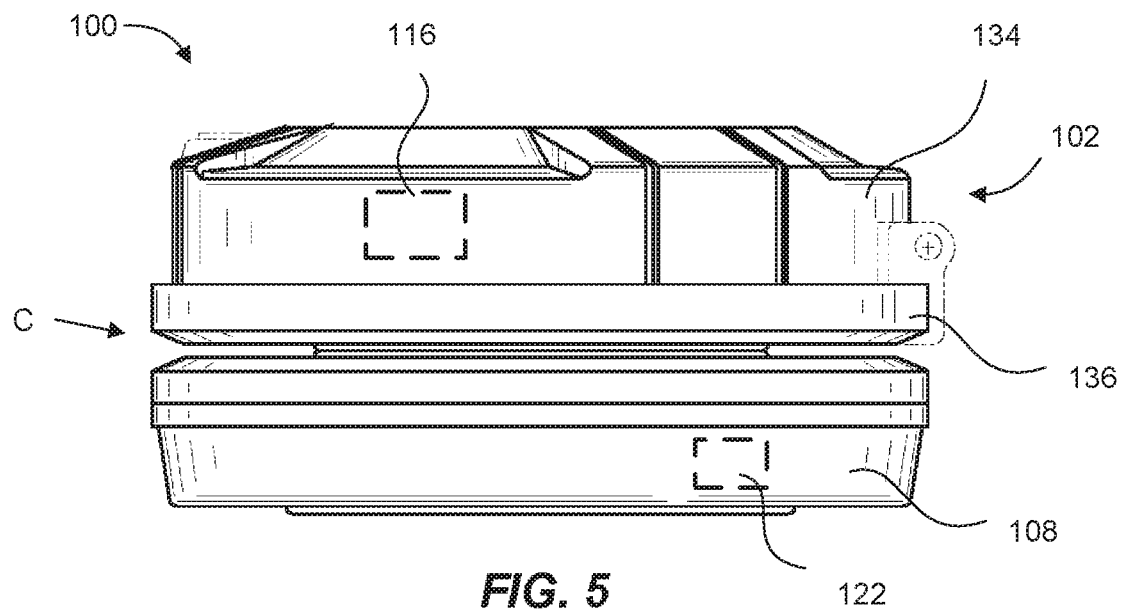
FIG. 5 is a side view of FIG. 1.
Figure 6:
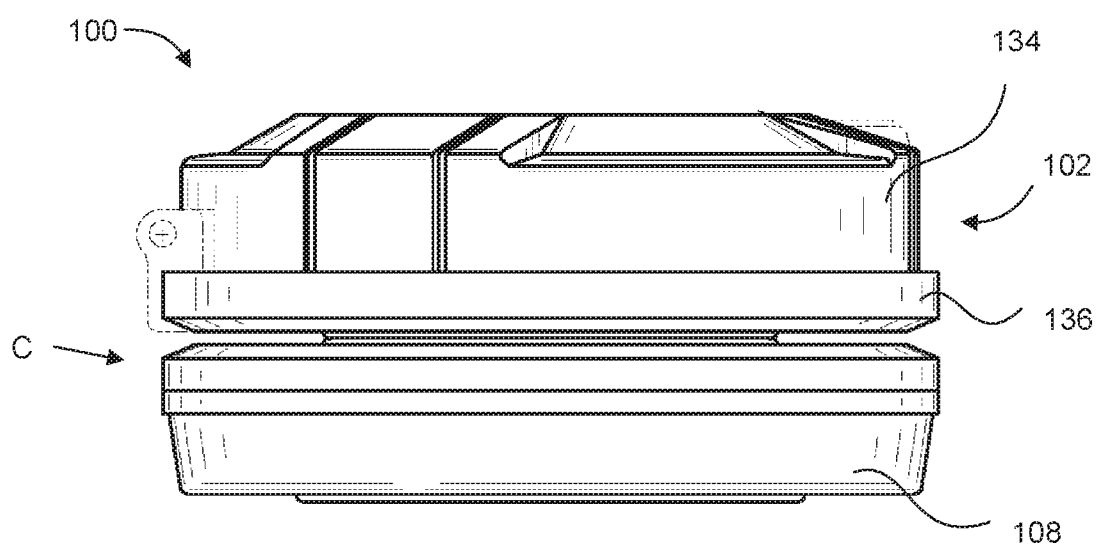
FIG. 6 is an opposite view of FIG. 5.
Figure 7:
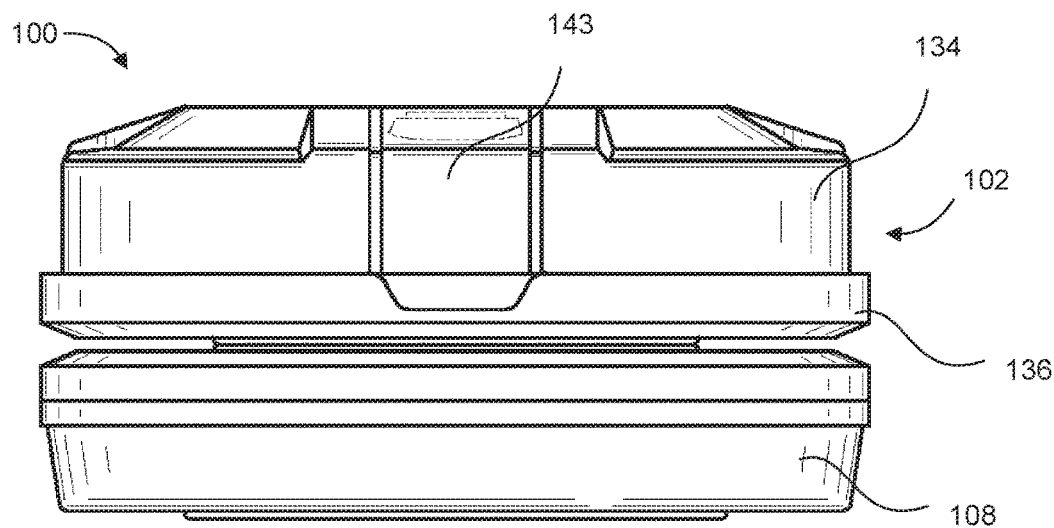
FIG. 7 is a front view of the lighting device shown on FIG. 1.
Figure 8:
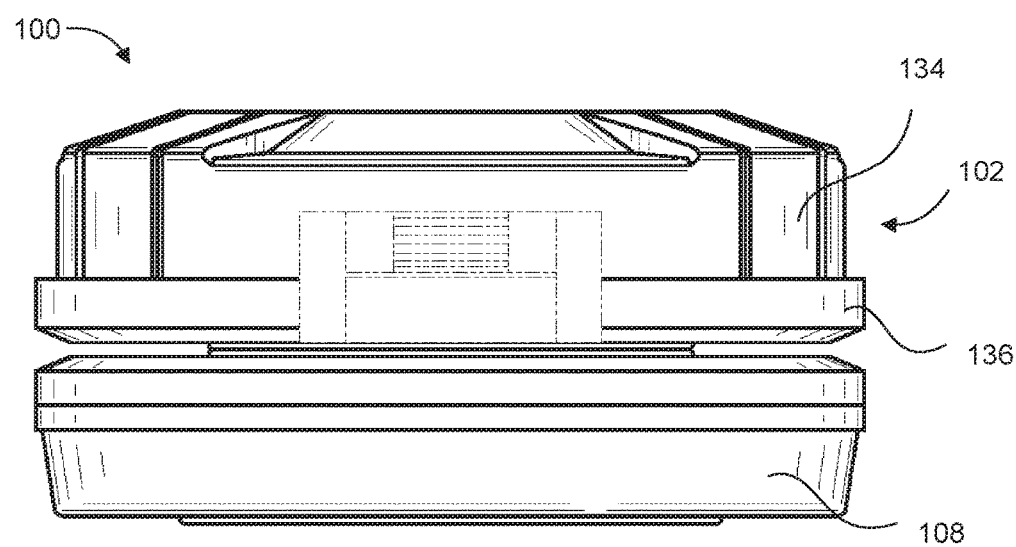
FIG. 8 is a back view of the lighting device shown on FIG. 1.
Figure 9:
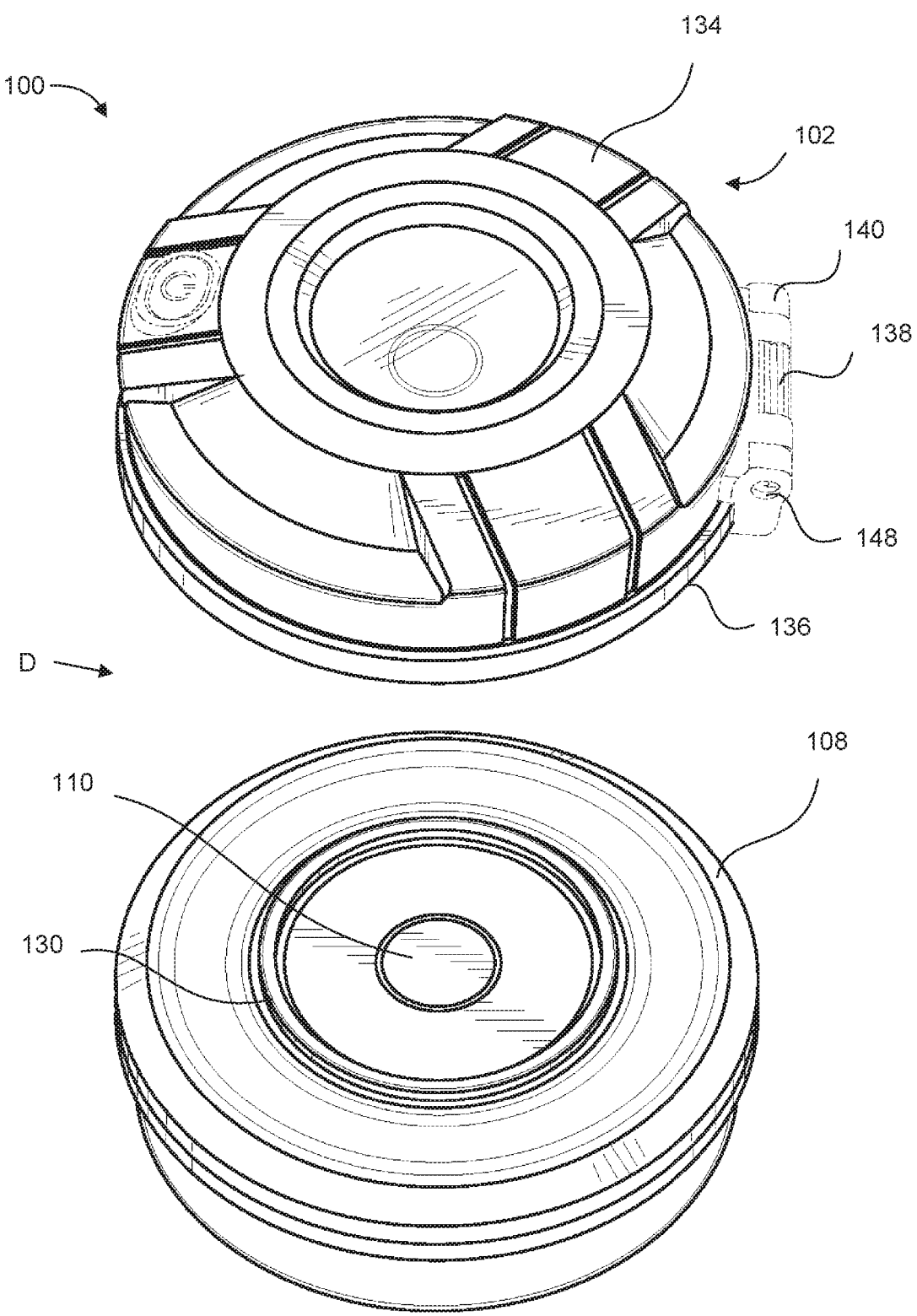
FIG. 9 is an elevated, perspective view of the lighting device in a second configuration.
Figure 10:
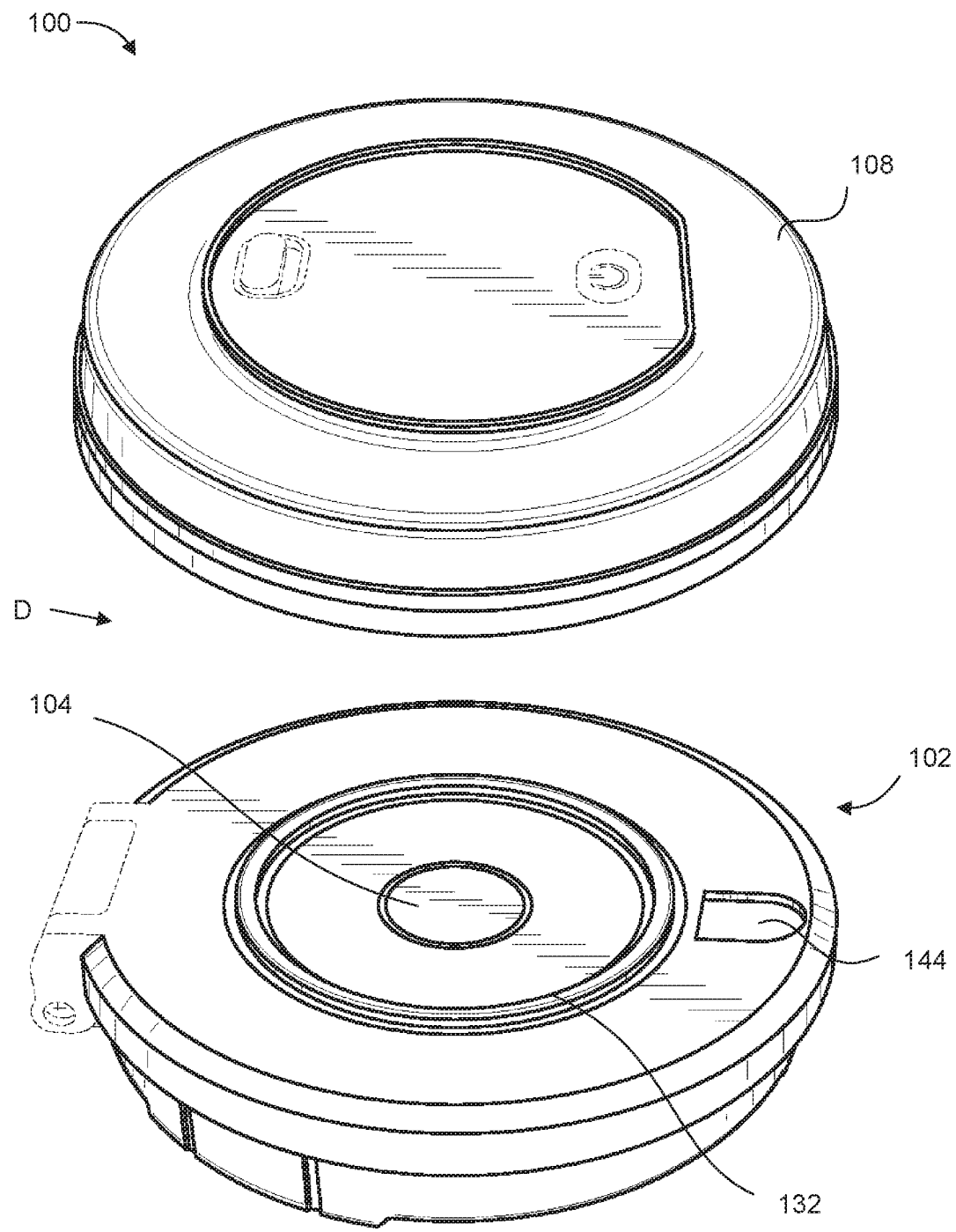
FIG. 10 is a bottom view of FIG. 9.

FIGS. 1-11 show a variety of views (as noted above) and positional configurations of a lighting device 100 in accordance with one aspect of the present disclosure. FIG. 12 shows a method of using the lighting device 100 in an emergency situation that can provide a hands-free emergency lighting method. The lighting device 100 can comprise a primary housing 102 having a magnet 104 and having a light source 106 capable of emitting light (FIGS. 1 and 10). A secondary housing 108 can also have a magnet 110 and have at least one light source 112 capable of emitting light (FIGS. 2 and 9). The magnet 104 of the primary housing 102 and the magnet 110 of the secondary housing 108 can be releasably coupled to each other (see FIGS. 5, 6, 9, and 10 for exemplary views of the magnetic coupling of the housings). In some examples, the primary housing 102 and the secondary housing 108 are each generally cylindrical in shape and, when coupled together, can define a generally cylindrical puck (FIGS. 1, 2, 5, and 6).

With continued reference to FIGS. 1 and 2, the lighting device 100 is shown in the coupled position C (also the position shown on FIGS. 3-8). The primary housing 102 may include a clear panel 114 (e.g., transparent or semi-transparent) positioned above and proximate the light source 106 to allow the passage of light to the ambient area. The primary housing 102 may include a battery 116 (FIG. 5) electrically coupled to the light source 106 and a power button 118 for actuation by a user to turn on and off the light source 106. Preferably, the light source 106 is one or more LEDs capable of generating a spot light, flood light, and/or strobe light, which may be changed by programmable actuation of the power button 118 (e.g., two clicks of the power button may activate a strobe light emitting light source). Of course, a small electronics assembly (not shown) would necessarily be coupled to the light source 106, the power button 118, and the battery 116.

The secondary housing 108 may include one or more light sources 112 that can be electrically coupled to each other and positioned about an internal perimeter of the housing 108 and internally of a cover 120 (light sources 112 are only shown schematically on FIG. 2). The perimeter cover 120 may be transparent or semi-transparent (e.g., tinted red) to assist with indicating an emergency when the light sources 112 are activated. The light sources 112 can be electrically coupled to an electronics assembly (not shown), a battery 122 (FIG. 5), and a power button 124 for actuation by a user to turn on and off the light sources 112. Preferably, the light sources 112 are LEDs connected electronically in series (or a plurality of LEDs on a single chip) and capable of generating a plurality of constant red illuminations and/or alternating red illuminations to indicate an emergency. The type of illumination may be changed by a programmable actuation of the power button 124. For example, a first click of the power button activates a constant red illumination, a second click activates an alternating red illumination, and a third click turns off the light sources. Of course, other programmable illuminations and colors or types of LEDs can be used to indicate an emergency. Additionally, a slide button 126 may be provided to open a panel 128 of the secondary housing 108 for access to change or charge the battery, for instance. The lighting device 100 in a coupled position C is configured such that a direction of light emitted from primary housing 102 is propagated in a direction that is opposite the direction of light emitted from secondary housing 108. In one aspect, each housing 102, 108 is configured to have a hemisphere of illumination. The center of the hemisphere of illumination is collinear with the center of the respective housing. In an aspect where the housing is circular, the center of illumination is the center of the circular housing. While light is propagated in opposite directions, when lighting device 100 is in a coupled position C, light is also propagated in a number of difference directions within each hemisphere of a respective housing. However, while in the coupled position C, light emitted from secondary housing 108 is not propagated in the same direction as light emitted from primary housing 102.

With further reference to FIGS. 9 and 10, the lighting device 100 is shown in the decoupled position D (also the position shown on FIG. 12). The secondary housing 108 includes the magnet 110 that is magnetically attracted and coupleable to magnet 104 of the primary housing 102. The force required to decouple the housings from each other may be low (ranging from less than 1 pound up to 5 pounds, for example) such that an average person can decouple the housings with his/her hands. A bottom surface of the primary housing and secondary housing is substantially planar such that when the two housing are coupled together the interface between the two housings is also substantially planar. In one aspect, however, the bottom surface of the primary housing 102 comprises an annular groove or channel that mates with an annular protrusion of the secondary housing 108 to minimize lateral movement between the two housings when magnetically coupled together.

In one aspect of the technology, and with reference to FIG. 9, the secondary housing 108 can include a friction component 130 positioned adjacent the magnet 110, which may be an annular rubber or polymer gasket-like device attached to the housing 108 and around the magnet 110. Similarly, and with reference to FIG. 10, the primary housing 102 can include a friction component 132 positioned adjacent the magnet 104, which may be an annular rubber or polymer gasket-like device attached to the housing 102 around the magnet 104. The friction components of each housing can be interfaced to each other when in the coupled position C to prevent the housings from laterally sliding apart about the magnetic coupling during storage or use. While two frictional components are referenced herein, it is understood that a frictional component may be present on only one of the housings in order to create the desired level of resistance to lateral movement.

While specific reference is made herein to an annular frictional component, it is understood that different shapes (a single line, square, triangular, or otherwise) are contemplated for use herein. In one aspect, the friction component 130 is configured to nest within friction component 132. That is, the friction component 130 is shaped to approximate the shape of friction component 132 but has a smaller outer perimeter than the inner perimeter of friction component 312. In this manner, the resistance to lateral movement between the two magnetically coupled housings is increased. It is also noted that while the magnet 104 is shown inside or circumscribed by frictional component 132, the magnet 104 may be outside the frictional component. That is, the magnetic coupling between opposing housings may take place about the center of the housing or near the outer perimeter of the housing as suits a particular design.

Figure 11:
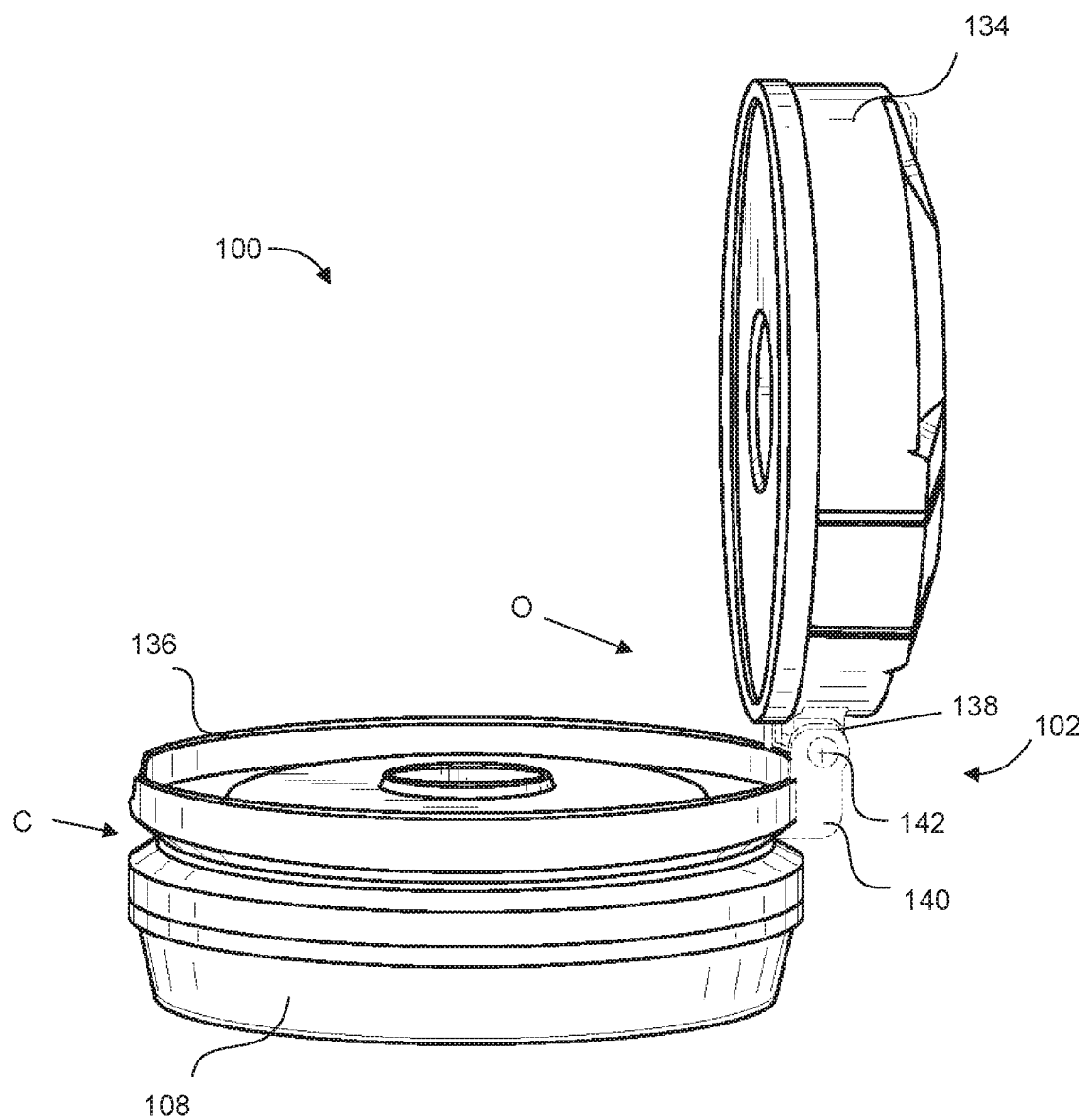
FIG. 11 is a side view of the lighting device in a third configuration.
Figure 12:
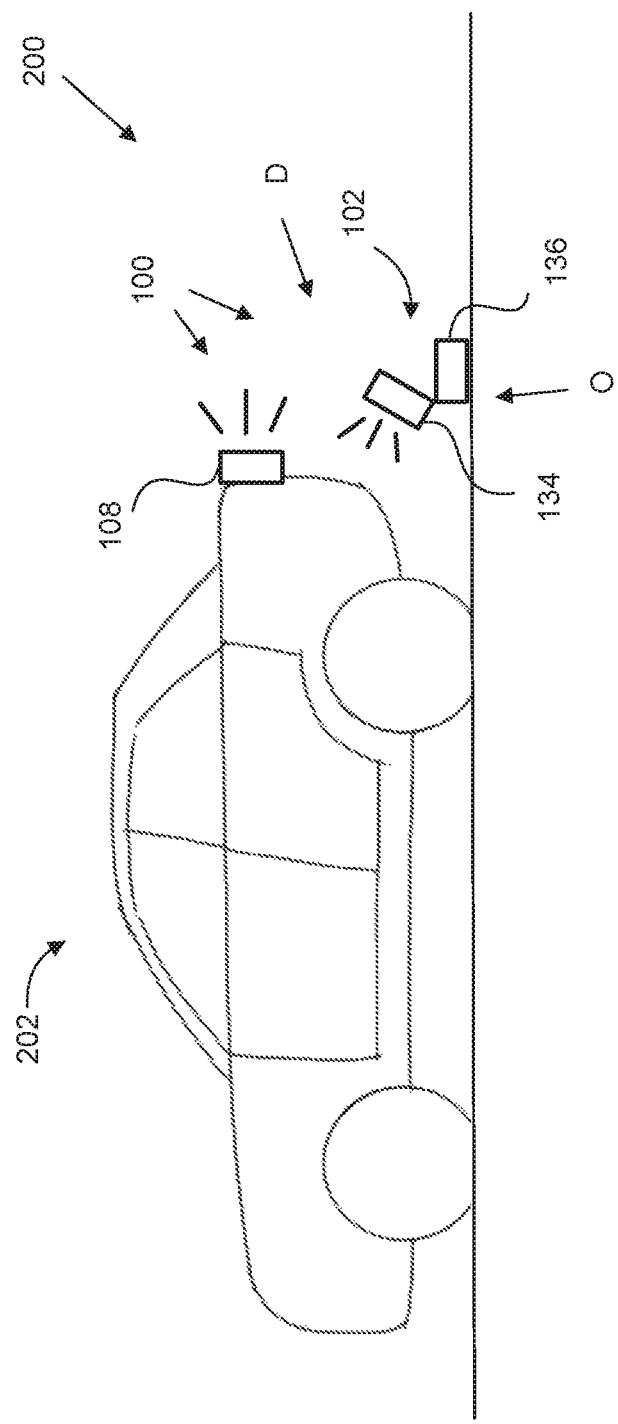
FIG. 12 is a schematic of using the lighting device in an emergency situation in accordance with an example of the present disclosure.

With further reference to FIG. 11, the lighting device 100 is shown in the coupled position C, while the primary housing 102 is shown in the open position O (compare to the closed position of FIGS. 9 and 10). In the open position O, the primary housing 102 includes an upper shell 134 and a lower shell 136 pivotally coupled to each other in at least one degree of freedom to form a clamshell configuration, for example. The upper shell 134 can include an attachment portion 138 proximate a perimeter of the upper shell 134, and the lower shell 136 can include a corresponding attachment portion 140 proximate a perimeter of the lower shell 136 (see also FIG. 1). Thus, the attachment portion 138 and the corresponding attachment portion 140 can be pivotally coupled to each other by a pin 142 (or they can be friction fit) in at least one degree of freedom (i.e., rotationally about an x-axis of the attachment portions and pin). In some examples, the upper shell 134 pivots relative to the lower shell 136 in at least 180 degrees. In one example, a release mechanism 143 (FIG. 7) can be formed as part of the upper shell 134 to allow release of the shells from each other by a user to facilitate the aforementioned pivotal movement of the clamshell. In some examples, the upper shell 134 can also be rotationally coupled about a y-axis of the attachment portions such that the upper shell 134 can "twist" relative to the lower shell 136 in at least 180 degrees.

In some examples, the primary housing 102 includes an aperture 144 (FIG. 10) coupleable to a support device (e.g., a hook/nail or cable/rope) to provide a hands-free lighting source when the primary housing 102 is in the open position and decoupled from the secondary housing 108. While aperture 144 serves to help place the primary housing 102 while in use, the magnet 104 associated with primary housing 102 also serves to couple the primary housing to a support surface so that the light emitted from primary housing may be directed to a desired work area.

With further reference to FIG. 12, a hands-free emergency lighting method 200 is illustrated. Here, the lighting device 100 is in the decoupled position D and the upper housing 102 is in the open position O (but it may be put in a closed position as well, such that the light source would be illuminating upwardly). The secondary housing 108 is magnetically coupled to a metal surface of a car 202. The light sources 112 of the secondary housing 108 are actuated to illuminate red-blinking or red-constant lights to indicate an emergency to others. The primary housing 102 can rest on a road surface such that the upper shell 134 is angled upwardly from the lower shell 136 to allow the light source 106 to illuminate an area. The primary housing 102 can also magnetically couple to the underside of the hood of a vehicle or other location on the vehicle to illuminate the desired work area. This method of lighting allows a user to be hands-free while fixing a tire, for example, while concurrently indicating an emergency from the secondary housing 108 and providing a working light source form the primary housing 102 at a desired angle of illumination, for example.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A lighting device comprising:
a primary housing having a light source and first power source capable of emitting light in a first direction, said primary housing having a top and a substantially planar bottom; and
a secondary housing having a light source and a second power source capable of emitting light in a second direction, said secondary housing having a top and a substantially planar bottom, the primary housing and the secondary housing magnetically and releasably coupled to each other by at least one magnet,
wherein when the primary and second housings are coupled to each other the substantially planar bottom of the primary housing is adjacent the substantially planar bottom of the secondary housing and light emitted from the primary housing in the first direction is propagated in a direction opposite the light emitted from the secondary housing in the second direction.

2. The lighting device of claim 1, wherein the primary housing and the secondary housing are each (i) generally cylindrical in shape and, when coupled together, define a generally cylindrical puck or (ii) generally rectangular in shape and, when coupled together, define a cube.

3. The lighting device of claim 1, wherein the primary housing and the secondary housing each include a magnet, wherein the magnet of the primary housing is interfacable with the magnet of the second housing.

4. The lighting device of claim 1, wherein the primary housing includes an upper shell and a lower shell pivotally coupled to each other in at least one degree of freedom.

5. The lighting device of claim 4, wherein the upper shell pivots relative to the lower shell in at least 180 degrees.

6. The lighting device of claim 4, wherein the lower shell includes the magnet of the primary housing and the upper shell includes the light source of the primary housing.

7. The lighting device of claim 4, wherein the upper shell includes an attachment portion proximate a perimeter of the upper shell, and the lower shell includes a corresponding attachment portion proximate a perimeter of the lower shell, whereby the attachment portion and the corresponding attachment portion are pivotally coupled to each other in at least one degree of freedom.

8. The lighting device of claim 1, wherein the secondary housing is magnetically coupable to a metal surface and the light source of the secondary housing provides an emergency emitting light source.

9. The lighting device of claim 1, wherein at least one of the primary housing and the secondary housing includes a friction component positioned between the housings adjacent the respective magnetic.

10. The lighting device of claim 1, wherein at least one of the primary housing and the secondary housing include an emergency emitting light source.

11. The lighting device of claim 1, wherein the primary housing includes an aperture coupleable to a support device to provide a hands-free lighting source.

12. The lighting device of claim 1, wherein the first and second power sources each comprise a battery, wherein the lighting device is devoid of external electrical supply cables.

13. A lighting device comprising:
   a substantially cylindrical puck comprising:
      a primary puck and a secondary puck magnetically and releasably coupled to each other, wherein the primary puck and the second puck comprise bottom surfaces that mate with one another, and
      wherein each of the primary puck and the secondary puck include a light source capable of emitting light in opposing directions when coupled together.

14. The lighting device of claim 13, wherein the primary puck includes an upper shell and a lower shell pivotally coupled to each other to form a clamshell configuration.

15. The lighting device of claim 13, wherein the primary puck includes a magnet coupleable to either the secondary puck or a metal surface, and wherein the secondary housing includes a magnet coupleable to the primary puck or a metal surface.

16. The lighting device of claim 13, wherein the secondary puck includes an aperture coupleable to a support device to provide a hands-free lighting source.

17. The lighting device of claim 14, wherein the upper shell includes an attachment portion proximate a perimeter of the upper shell, and the lower shell includes a corresponding attachment portion proximate a perimeter of the lower shell, whereby the attachment portion and the corresponding attachment portion are pivotally coupled to each other in at least one degree of freedom.

18. A hands-free emergency lighting method comprising:
   obtaining a primary housing having a bottom surface magnetically coupled to a bottom surface of a secondary housing, the primary housing having a light source and the secondary housing having a light source, wherein the light source from the primary housing is capable of propagating light in a direction opposite light that is propagated from the light source of the secondary housing;
   decoupling the primary housing from the secondary housing;
   magnetically coupling the secondary housing to a metal surface;
   activating the light source of the secondary housing to indicate an emergency; and
   placing the primary housing on a support surface such that light emitted from the primary housing illuminates a work area.

19. The method of claim 18, further comprising opening the primary housing and activating its light source, the primary housing having an upper shell and a lower shell pivotally coupled to each other in at least one degree of freedom.

20. The method of claim 19, further comprising resting the lower shell on a support surface or hanging the lower shell from a support device, and activating the light source of the primary housing to create a hands-free emergency lighting system using the secondary housing coupled to the metal surface and the primary housing resting on the support surface.

* * * * *